(No Model.)
J. C. MATTICE.
POTATO DIGGER.
No. 349,166. Patented Sept. 14, 1886.
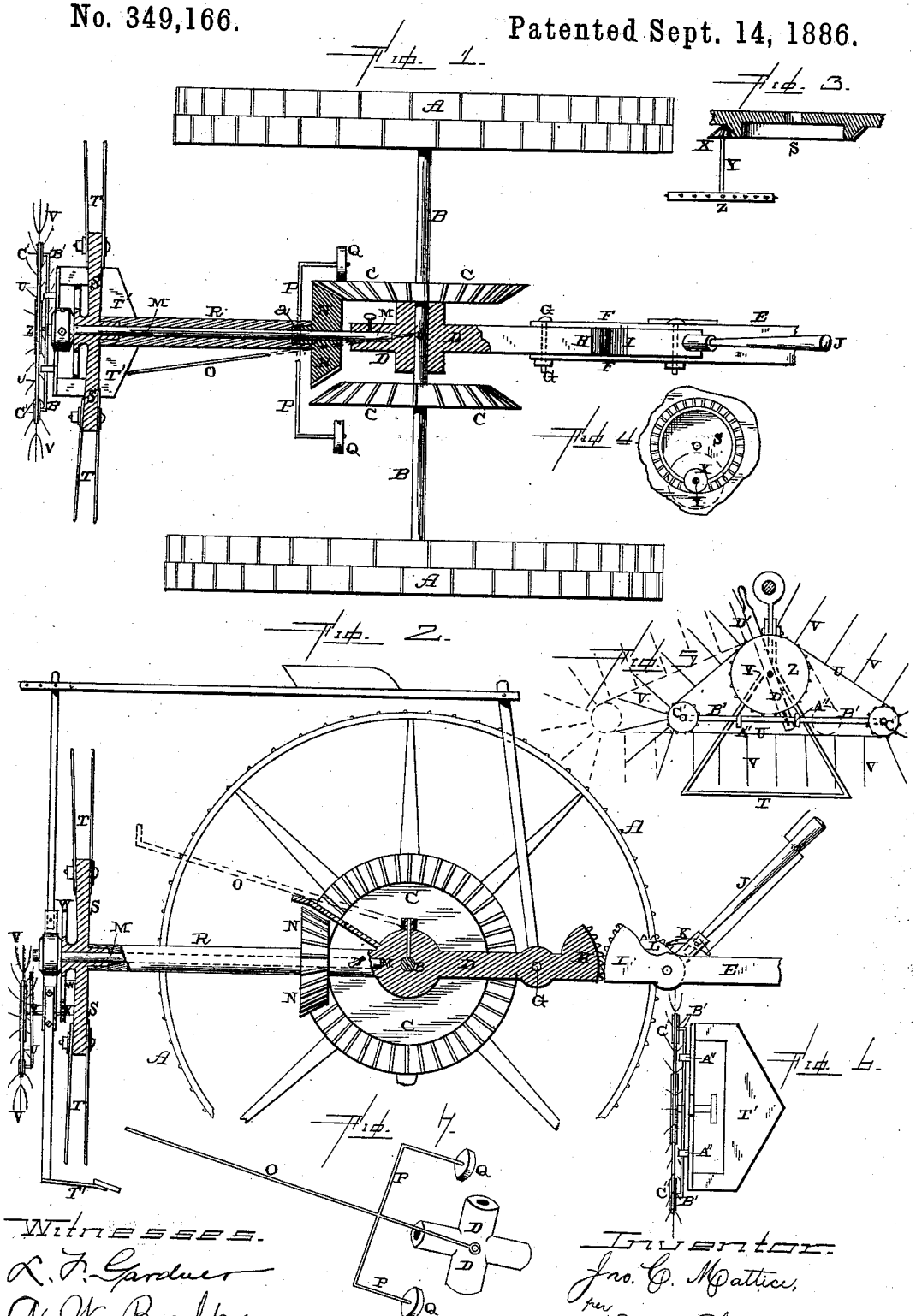

UNITED STATES PATENT OFFICE.

JOHN C. MATTICE, OF COHOCTON, NEW YORK.

POTATO-DIGGER.

SPECIFICATION forming part of Letters Patent No. 349,166, dated September 14, 1886.

Application filed February 19, 1886. Serial No. 192,524. (No model.)

*To all whom it may concern:*

Be it known that I, JOHN C. MATTICE, of Cohocton, in the county of Steuben and State of New York, have invented certain new and useful Improvements in Potato-Diggers; and I do hereby declare the following to be a full, clear, and exact description of the invention, such as will enable others skilled in the art to which it pertains to make and use it, reference being had to the accompanying drawings, which form part of this specification.

My invention relates to an improvement in potato-diggers; and it consists in, first, the combination of the axle, the driving-wheels placed thereon, the beveled gears which are rigidly secured to the axle and placed in reverse position to each other, a sliding casting which is placed upon the axle in between the two beveled gears, and which casting has the tongue adjustably connected to its front end, and which forms a support at its rear end for the rod upon which the operating-pinion, sleeve, and reel are placed, with a lever or other shifting mechanism, by means of which the casting can be moved laterally upon the axle, so as to bring the pinion in gear with either one of the large beveled gears, according to the direction to which the reel is to revolve; second, in a potato-digger, a casting which is placed upon the axle, and which has the tongue adjustably connected to its front end, and which at its rear end forms a support for the rod upon which the operating parts are placed, whereby the usual frame-work used in connection with potato-diggers is entirely dispensed with; third, the combination of the casting placed upon the axle, a stationary rod which is secured to the rear end of the casting, and upon which the operating parts are placed, the reel which revolves with the sleeve upon the rod, and the shovel which is secured to the rear end of the rod, so as to be pushed along in front of the reel as the machine advances, in contradistinction to being drawn along with the frame of the machine in the usual manner; fourth, the combination, with the shoe, of an endless chain provided with forks, or other equivalent devices, which separate the potatoes from the dirt after they have been dug and leave them in rows; fifth, the arrangement and combination of devices, which will be more fully described hereinafter.

The objects of my invention are to dispense with the usual frame-work which has heretofore been employed in potato-diggers, and thus cheapen and simplify the machine; to so attach the shovel or foot that it is pushed along in front of the reel, in contradistinction to being drawn along, as has heretofore been the case, and to connect to the shovel a mechanism which will not only separate the potatoes from the dirt, but at the same time leave them in rows.

Figure 1 is a plan view of a potato-digger embodying my invention, shown partly in section. Fig. 2 is a vertical section of my potato-digger. Figs. 3 and 4 are detail views of a modification. Figs. 5, 6, and 7 are detail views of the different parts.

A represents the driving-wheels; B, the axle, which is rigidly secured thereto, so as to revolve with them, and C the beveled gears which are rigidly secured to the axle, but placed in reverse positions in relation to each other. Placed upon the axle and made laterally movable thereon between the two beveled gears is the casting D, which may either be given the shape shown or any other that may be preferred. The front end of this casting D projects forward a suitable distance and has the tongue E loosely connected thereto by means of the plates F, which are secured to the rear end of the tongue, and which are connected to the front end of the casting D by a pivotal bolt, G. The front end of the casting D is formed into a toothed arc, H, with which a corresponding toothed arc, I, rigidly secured to the rear end of the tongue and in between the two connecting-plates, engages. Connected to this toothed arc I on the tongue is a suitable lever, J, to which is connected a pawl, K, which engages with the ratchet L, secured to the side of the tongue. By moving this lever the front end of the casting may be either raised or lowered, as desired. When the front end is raised upward, the foot and the reel are made to run deeper, and when the front end is depressed the foot and reel are made to run shallow. By this means the foot is made to operate at any desired depth.

Rigidly secured in a socket in the rear end of the casting D is the rod M, which carries all of the operating parts. Upon the front end of this rod is loosely placed the pinion N, which is made to engage with either one of the beveled wheels C that may be desired, according as the potatoes are to be thrown to the right or left of the row. For the purpose of enabling this pinion to be shifted from one wheel to the other, or to be lifted midway between the two wheels, so that the reel will not be made to operate when the machine is being moved back and forth from the field, the casting D is made laterally movable upon the axle, so as to be moved in contact with either one of the wheels C. This movement of the casting D is effected by means of the lever O, which is pivoted upon the top of the casting, and which has radiating from it in opposite directions the two arms P, carrying the friction-rollers Q. These arms project beyond the outer sides of the beveled gears, and these friction-rollers are made to alternately bear against one or the other of the beveled gears, according as it is desired to move the casting and pinion either to the right or left. When one of the friction-rollers is made to bear against the outer side of its corresponding beveled gear, the friction-roller acts as a fulcrum to receive the pressure of the lever, and thus cause the casting to be shifted upon the axle.

The pinion has a tenon, $a$, formed upon its rear end, and which tenon fits in a socket in the front end of the sleeve R, and thus causes the sleeve to revolve with it. This tenon will be made of suitable length, so that the sleeve can be adjusted back and forth upon the rod around which it revolves without in any way affecting the gearing of the pinion with the beveled gears C. To the rear end of this sleeve R is rigidly secured the reel S, which consists of a circular plate to which the wires or rods T are adjustably fastened. This reel is intended to be adjusted back and forth with the sleeve R, so as to bring it in any desired relation to the foot before it revolves, for the purpose of separating the potatoes from the dirt.

Rigidly secured to the rear end of the stationary rod is the foot or shovel T'. This foot or shovel is made of suitable width, and is intended to be pushed forward from the upper end of its standard through the ground, for the purpose of digging the potatoes. The standard of this shoe being shoved forward through the ground from its upper end only, the reel is made to revolve just in the rear of the shoe, and all of the vines and weeds which would have a tendency to collect upon the standard are thrown to one side, so that the machine can be drawn freely along without clogging in the slightest. Where the shovel is drawn along instead of being forced forward, as here shown, even though used in connection with a reel, the shovel will clog, on account of the side braces which are connected to it and to the frame-work of the machine for the purpose of pulling the shovel or foot forward. By the construction here shown all this frame-work and all of the brace-rods are entirely dispensed with, and the shovel or foot is pushed forward from the upper end of the standard only. The reel being made to revolve either toward the right or left, as may be desired, the potatoes, weeds, and grasses are thrown to either side of the furrow that may be preferred.

In order to not only separate the potatoes which drop behind, or which pass over the top of the shovel, from the dirt, and to leave them in a row on one side of the furrow, an endless chain belt, U, provided with forks or other suitable devices, V, is used. This belt may be operated either by means of a chain, W, which passes over a sprocket-wheel formed upon the hub of the reel, and which chain then passes around a pulley, X, upon the shaft Y, or there may be formed teeth upon the rear side of the reel, and the pulley X be made to engage with these teeth, as shown in Figs. 3 and 4. The shaft Y is journaled in suitable bearings in the standard, and has a large sprocket-wheel, Z, secured to its rear end. Also secured to the standard are suitable bearings, A'', through which passes the endwise-sliding rod B', which has a small sprocket-wheel, C', attached to each of its ends. The endless chain U passes around the sprocket-wheels Z C', as shown, and as the forks are secured to the chain the potatoes are moved toward one side of the furrow or the other, according to the direction the reel is made to revolve. For the purpose of enabling the potatoes to be lifted entirely clear of the furrow, the rod B' is made to move endwise through its bearings by means of the lever D'. By shifting the upper end of this lever D' from one side to the other the rod B' is forced to a corresponding distance in the opposite direction, and then, as the endless chain is made to revolve, the forks separate the potatoes from the dirt and leave them in a row at one side of the furrow. A suitable slot should be made in the lower end of the lever D', so that the rod B' can be shifted without any binding or unnecessary wear.

It is immaterial which means are used to cause the endless belts to revolve. Either one of the means here shown may be used, or any other that may be preferred. The teeth of the reel are made adjustable, so that the reel can be made larger or smaller, as may be desired.

A frame upon which the driver can ride is connected to the casting and to the rear end of the rod, as shown in Fig. 2.

Having thus described my invention, I claim—

1. In a potato-digger, the combination of the driving-wheels, the axle, and the two beveled gears secured to the axle, with a casting or frame which is laterally adjustable upon the axle, and which has the operating mechanism connected to it, so as to be moved with it, substantially as shown.

2. In a potato-digger, the combination of the driving-wheels, the axle, and the beveled gears secured to the axle, with the casting which is placed upon the axle, and which has the tongue connected to its front end and the operating mechanism to its rear end, and which casting is made adjustable back and forth between the two wheels C, substantially as described.

3. The casting D, made laterally adjustable upon the axle, and having its front end provided with teeth, in combination with the tongue having teeth secured to its rear end, and connected to the front end of the casting by suitable plates, an operating-lever, pawl, and ratchet, substantially as set forth.

4. The combination of the casting D, having the tongue connected to its front end, in combination with the stationary rod M, which is secured to its rear end, the pinion and the sleeve, and the reel and the foot, which are placed upon the stationary rod, substantially as specified.

5. The combination of the wheels A, axle B, gears C, casting D, having the tongue loosely connected to its front end, and carrying the operating mechanism at its rear end, and the operating-lever O, provided with the friction-rollers Q, for bearing against the sides of the gears C, substantially as shown.

6. The combination of the reel, the shaft Y, having a pinion, X, upon its inner end and the wheel Z upon its rear one, with the endless chain provided with forks, and the sprocket-wheel C', substantially as set forth.

7. The combination of the standard of the foot or shovel, the endwise-moving rod B', carrying the wheels C', the endless chain U, provided with forks, the wheel Z, and a lever for shifting the rod B' through its bearing, substantially as specified.

8. In a potato-digger, the combination of the reel, the shovel or foot, and an endless chain or belt carrying teeth, and which is placed in the rear of the standard of the foot, for moving the potatoes to one side of the row, substantially as shown.

9. In a potato-digger, the combination of the reel S, the shovel or foot T', and an endless chain or belt carrying teeth for moving the potatoes to one side of the row, the said belt or chain being made movable from side to side, substantially as described.

10. In a potato-digger, the combination of the casting placed upon the axle, the stationary rod M, which is secured thereto, the pinion N, having the tenon $a$ formed upon it, and the sleeve R, which is adjustable back and forth upon the rod M, and which has a socket in its front end to receive the tenon on the pinion N, substantially as set forth.

In testimony whereof I affix my signature in presence of two witnesses.

JOHN C. MATTICE.

Witnesses:
  A. S. PATTISON,
  L. F. GARDNER.